US005600808A

United States Patent [19]
Kasukawa

[11] Patent Number: 5,600,808
[45] Date of Patent: Feb. 4, 1997

[54] PROCESSING METHOD BY WHICH CONTINUOUS OPERATION OF COMMUNICATION CONTROL PROGRAM IS OBTAINED

[75] Inventor: Masayuki Kasukawa, Numazu, Japan

[73] Assignee: Fujitsu Limited, Kawasaki, Japan

[21] Appl. No.: 257,575

[22] Filed: Jun. 9, 1994

Related U.S. Application Data

[63] Continuation of Ser. No. 151,772, Nov. 15, 1993, abandoned, which is a continuation of Ser. No. 554,362, Jul. 19, 1990, abandoned.

[30] Foreign Application Priority Data

Jul. 20, 1989 [JP] Japan ................................. 1-188273

[51] Int. Cl.$^6$ ....................................................... G06F 11/16
[52] U.S. Cl. ................................... 395/672; 364/DIG. 1; 364/DIG. 2; 364/265; 364/265.1; 364/265.5; 364/268; 364/268.1; 364/268.3; 364/268.9; 371/10.2
[58] Field of Search ..................... 371/9.1; 364/DIG. 1, 364/DIG. 2; 395/200, 250, 375, 800

[56] References Cited

U.S. PATENT DOCUMENTS

| | | | |
|---|---|---|---|
| 4,453,213 | 6/1984 | Romagosa | 395/575 |
| 4,610,013 | 9/1986 | Long et al. | 371/9.1 |
| 4,710,926 | 12/1987 | Brown et al. | 371/9.1 |
| 4,775,976 | 10/1988 | Yokoyama | 371/9.1 |
| 4,823,256 | 4/1989 | Bishop et al. | 371/9.1 |
| 4,930,128 | 5/1990 | Suzuki et al. | 371/11.3 |
| 4,977,500 | 12/1990 | Ogata et al. | 395/575 |
| 5,027,269 | 6/1991 | Grant et al. | 395/650 |
| 5,121,486 | 6/1992 | Kurihara et al. | 371/9.1 |
| 5,134,712 | 7/1992 | Yamamoto | 395/575 |
| 5,270,917 | 12/1993 | Kimura | 364/187 |
| 5,303,243 | 4/1994 | Anezaki | 371/9.1 |
| 5,341,496 | 8/1994 | Middledorp et al. | 395/575 |

FOREIGN PATENT DOCUMENTS 0021274 5/1987 European Pat. Off. .
0319034 6/1989 European Pat. Off. .

OTHER PUBLICATIONS

Villapiano, G. "Fault–Tolerant UNIX Supports Commercial Transaction Processing", *Computer Technology Review*, vol. 4, No. 3, 1984, pp. 335–336 and 340–341.

Yu et al., "Transaction Recovery in Distributed DB/DC Systems: A Progressive Approach", *Proceedings of Fifth Symposium on Reliability in Distributed Software and Database Systems*, 1986, pp. 207–214.

IBM OS/2 Programming Tools and Information Version 1.2 Programming Guide, Chapter 35 Communications Between Threads and Processes, 1987.

*Primary Examiner*—Robert B. Harrell
*Attorney, Agent, or Firm*—Staas & Halsey

[57] ABSTRACT

A computer system comprising an application program, a communication control program operating a communication access method having an active process and standby process, an operational environment information storing portion in a common memory to which the active process and the standby process have access, and processor(s). A process for executing the communication control program is multiplexed by the active process and the standby process, the active process forms an operational environment of a logical connection between an application program and a user terminal, and the operational environment is set in the common memory. When the active process malfunctions and an event wherein the standby process cannot continue the communication occurs, in each logical connection, an under data processing flag is stored in the common memory, and the flag is cleared when the process of the event is completed. The standby process accesses the operational environment storing portion in the common memory, and the operational environment information in each logical connection is taken from the active process. Here, the common memory is examined to determine whether the flag is stored or not, and if the flag is stored, the logical connection is disconnected and the warning of the abnormality is sent. In the communication of the logical connection wherein the flag is not set, the communication control program operates continuously, and thus a continuous operation in the computer system is obtained at a low cost.

8 Claims, 7 Drawing Sheets

PROCESSING METHOD BY WHICH CONTINUOUS OPERATION OF COMMUNICATION CONTROL PROGRAM IS OBTAINED

This application is a continuation, of application Ser. No. 08/151,772, filed Nov. 15, 1993, now abandoned, which is a continuation of Ser. No. 07/554,362, filed Jul. 19, 1990, now abandoned.

BACKGROUND OF THE INVENTION

1. Field of the Invention

The present invention relates to a processing method for obtaining continuous operation of a communication control program in a computer system provided with a common memory which can be accessed by an active process and a standby process for executing the communication control program.

2. Description of the Related Art

In a computer system, when a communication access method operated by a communication control program cannot be used because of a hardware malfunction or software failure in the computer system, a user (application program or terminal operator) utilizing the communication control program cannot operate the system continuously due to this malfunction or failure. Accordingly, the user must reestablish a logical connection to a communication terminal, and must restart the operation in order for it to continue. Namely, the user must execute the following complicated steps: restart the communication access method; reestablish the logical connection; examine the effects of the malfunction and recover the process; and restart the operation when the communication access method goes down.

In one obvious method of solving the conventional problems involved, the communication control program is duplicated by an active process and a standby process. The active process operates during normal operation. The standby process, which is not affected by the failure of the active process, is brought from the standby state to operate the program continuously when the active process cannot be operated.

By using a common memory to which both the active process and the standby process have access, and by taking, when the active process fails, all of the data of the connection operational environment or the transmission and reception signals used by the active process, the standby process can continue the operation.

Namely, a continuous operation can be obtained by the following steps. First, when the connection is made, the connection operational environment is stored in the common memory; when data is received, the received data is stored in the common memory; the data is transmitted, and upon completion thereof, the received data is cleared from the common memory; and when the active process becomes inoperative, the operational environment and received data are taken from the common memory by the standby process and the operation is continued.

In the above processing, however, the storing of the received data in the common memory or the clearing of the data affects the performance of the normal operation. Further, since all of the received data is stored, a large capacity common memory is needed. Accordingly, the above steps are not a practical solution to this problem.

The present invention is intended to solve the above problems.

SUMMARY OF THE INVENTION

Accordingly, an object of the present invention is to provide a processing method by which a continuous operation is obtained at a low cost to the user by specifying a communication affected by a malfunction of a communication control program during an active operation.

Therefore, according to the present invention, there is provided a processing method by which continuous operation of a communication control program in a computer system is obtained as follows. A process executing a communication control program is multiplexed by an active process and a standby process, and a common memory is provided which can be accessed by the active process and the standby process. The active process has a first process stage for setting operational environment information on the logical connection between an application program and a user terminal to be stored in the common memory. The active process has a second process stage for setting a flag indicating processing is under way (hereinafter, under processing flag 11) into the common memory so that when the active process becomes inoperative, the standby process will not continue the communication, and for clearing the under processing flag when the process is completed, in each logical connection. The standby process has a third process stage for accessing the common memory and for obtaining the operational environment information in each logical connection from the active process in advance, or when a warning is given that the active process has become inoperative. The standby process has a fourth process stage for only warning that an abnormality has occurred with regard to the logical connection for which the under processing flag is set in the common memory, when an operation by the active process is to be taken over.

Other features and advantages of the invention will be apparent from the following description given with reference to the accompanying drawings.

DESCRIPTION OF THE PREFERRED EMBODIMENTS

Prior to an explanation of an embodiment of the present invention, the prior art and an obvious solution to the problems arising in the prior art are explained with reference to the drawings.

Figure 1:
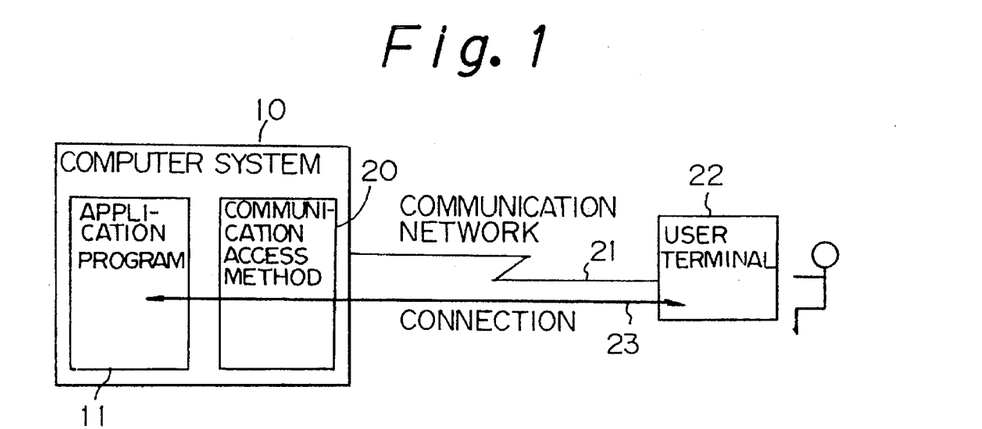
FIG. 1 is a block diagram explaining a communication control program in a system wherein user terminals are connected to a computer system through a communication network.

A conventional method is explained with reference to FIG. 1. In a computer system 10, when communication access method 20 operated by a communication control program cannot operate because of a hardware malfunction or software failure in the computer system 10, a user (application program 11 or terminal operator) utilizing the communication control program cannot operate the system continuously due to the malfunction or failure. Accordingly, the user must reestablish a logical connection 23 to a communication terminal, and must restart the operation in order to continue communication. Namely, the user must execute the following complicated steps, as shown in FIG. 1, when the communication access method 20 comes down or fails:

(1) restart the communication access method 20, (2) reestablish the logical connection 23, (3) examine the effects of the malfunction and recover the process, and (4) restart the operation.

One obvious solution to the problems arising in the prior art is explained with reference to FIG. 2. In this method, the communication control program is duplicated in an active process 13 and a standby process 14. The active process 13 operates during a normal operation, and the standby process 14, which is not affected by a failure of the active process, is brought from the standby state to operate the process continuously when the active process 13 comes down.

By using a common memory 15 to which both the active process 13 and the standby process 14 have access, and by taking or accessing all of the data of the connection operational environment or the transmission and reception signals used by the active process 13, the standby process 14 can continue the operation when the active process 13 fails.

Figure 2:
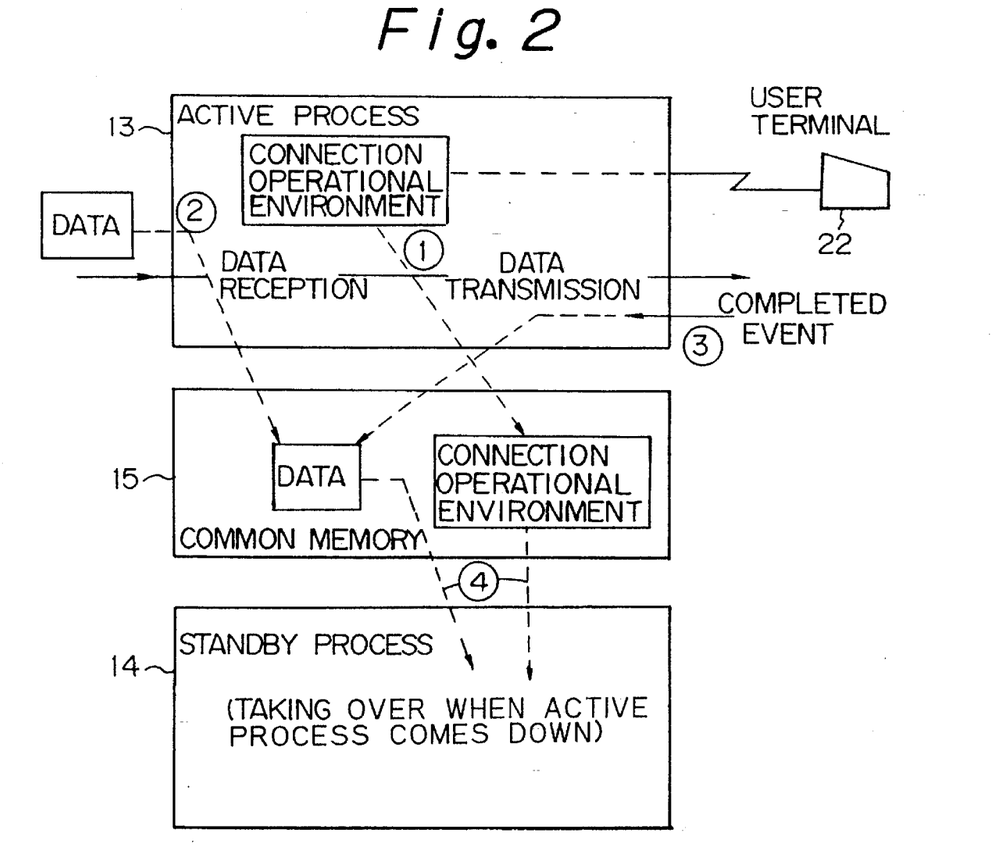
FIG. 2 is a block diagram explaining an obvious example of a way of solving problems arising in the system of FIG. 1.

Namely, as shown in FIG. 2, a continuous operation can be obtained by the following steps.

(1) When the connection is made, the connection operational environment is stored in the common memory 15.

(2) When data is received, the received data is stored in the common memory 15.

(3) The data is transmitted, and upon the completion thereof, the received data is cleared from the common memory 15.

(4) When the active process 13 becomes inoperative, the operational environment and received data are taken or obtained from the common memory 15 by the standby process 14 and the operation is continued.

In the above processing, however, the storing of the received data in the common memory 15 or the clearing of the data affects the performance of the normal operation. Further, since all of the received data is stored, a large capacity common memory 15 is needed. Accordingly, the continuous operation as shown in FIG. 2, is not a practical solution to the above problems.

Figure 3:
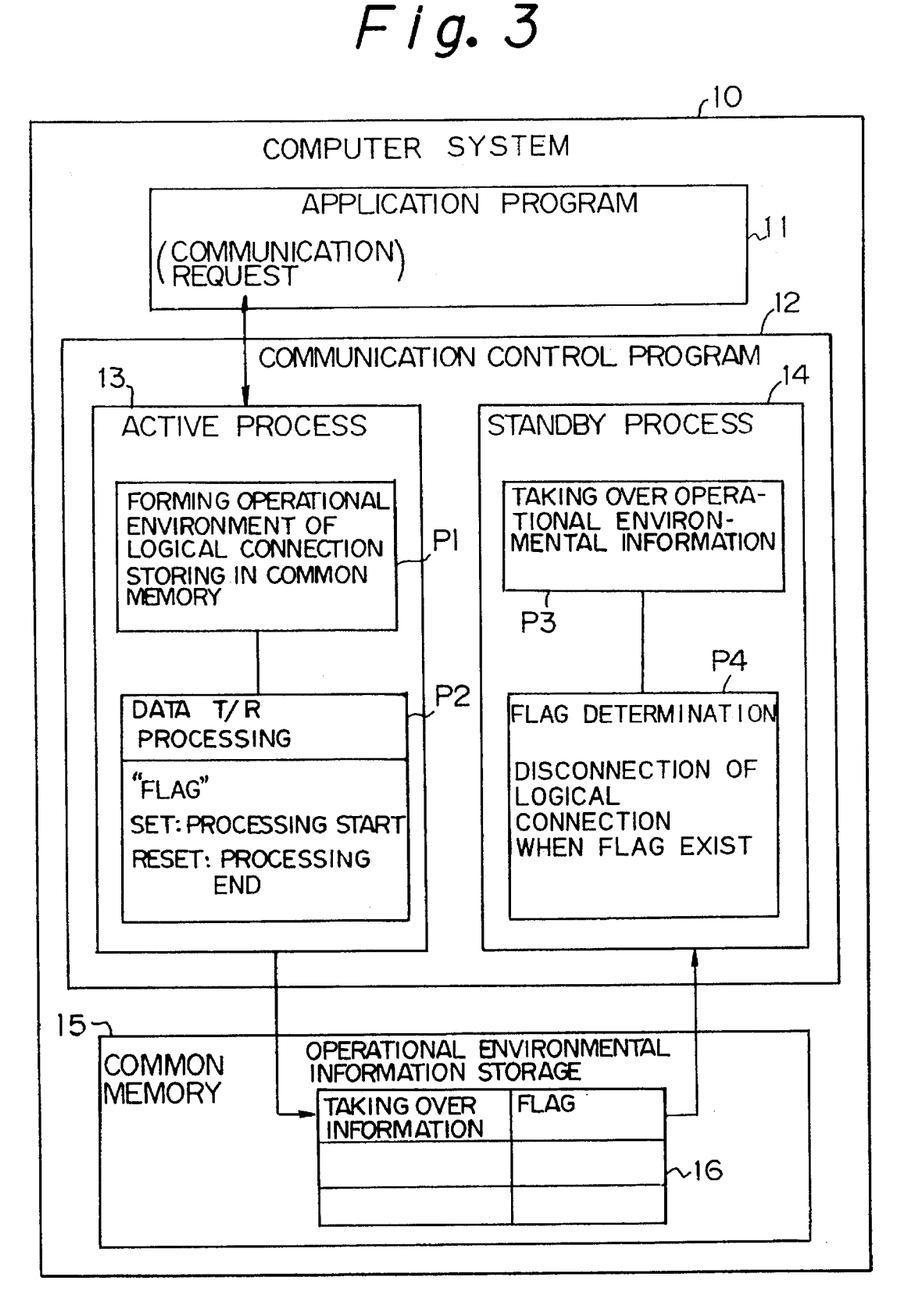
FIG. 3 is a block diagram summarizing an embodiment according to the present invention.
Figure 4:
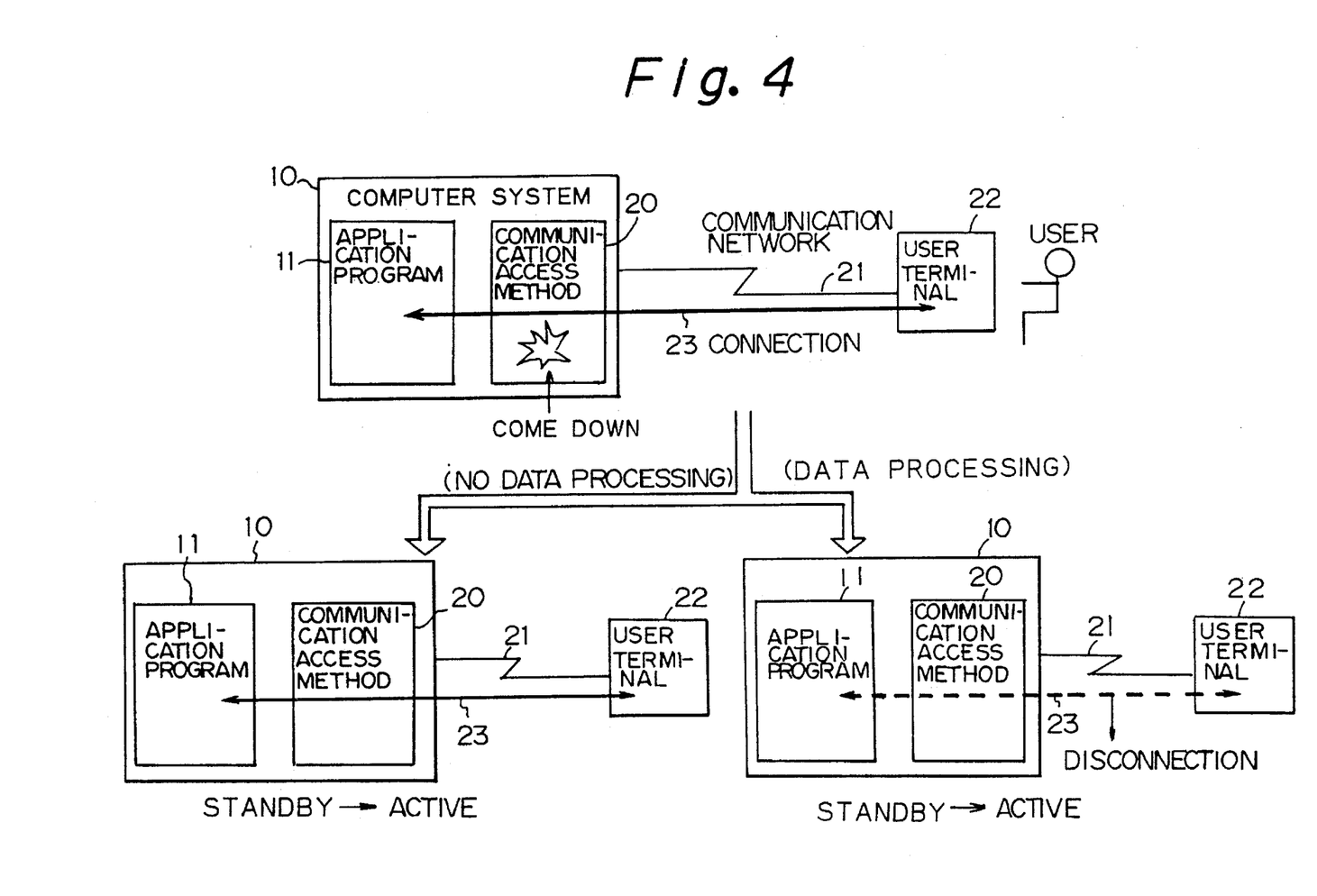
FIG. 4 is a block diagram explaining an operation of the embodiment of FIG. 3.

Next, an embodiment according to the present invention is summarized with reference to FIGS. 3 and 4.

In FIG. 3, 10 is a computer system providing having one or a plurality of processors (CPU), 11 is an application program executing processes requested by users using data communication, 12 is communication control program realizing a communication access method, 13 is an active process, 14 is a standby process, 15 is a common memory accessible by both the active process 13 and the standby process 14, and 16 is a operational environment information memory portion storing operational environment information which is taken or obtained from the active process 13 by the standby process 14.

In the computer system 10, the process executing communication control program 12 is multiplexed by the active process 13 and the standby process 14.

The active process 13 operates during normal operation, and the standby process 14 is brought from the standby state to operate the process continuously when the active process 13 comes down.

The active process 13 executes processing stages P1 and P2. In the processing stage P1, an operational environment is formed for a logical connection between the application program 11 for communication and a user terminal to which the communication is to be made, and the operational environment information is stored in the common memory 15.

In the processing stage P2, when an event occurs, which would prevent the standby process 14 from continuing the communication, while the active process 13 is operative, an under processing flag is stored in the common memory 15, in the logical connection(s) affected by the event, and when the processing of the event is completed the under processing flag is cleared. Namely, in an event such as a data transmission and reception process and the like (actual transfer of data), at the start of the process, an indication of that the processing is active is set in the portion corresponding to the logical connection in the operational environment information storing portion 16 in the common memory 15, and the indication of active processing is cleared at the end of the processing.

The standby process 14 executes processing stages P3 and P4. In the processing stage P3, the operational environment information storing portion 16 in the common memory 15 is accessed, and the operational environment information in each logical connection is taken from the active process 13 either in advance or when a warning is given that the active process is inoperative.

In the processing stage P4, when the information in the active process 13 is taken, a search is made in the common memory 15 for the under processing flag. If this flag is stored in the common memory 15, the logical connection having the flag is disconnected and a warning is given that the abnormality has occurred with regard to the logical connection. The operations for the other logical connections for which a flag is not set are continued by the communication program 12.

Generally, the communication process in the computer system 10 has the following features:

(1) In the case of either a data transmission request or a data reception request during normal operation, the request is processed instantly by the CPU. Namely, the request is not held by the communication control program 12.

(2) The process of the communication control program 12 is a flow of successive controls from a start of the process to the end thereof.

In consideration of these features, when the communication control program 12 malfunctions, since the cases wherein the communication control program 12 actually processes transmission or reception data of the communication are rare, little of the operation is affected by the failure of the communication control program 12.

In the present invention, in consideration of the above features, the logical connections between the application program 11 and user terminals affected by the failure of the communication control program 12 are specified. Only the affected application program(s) 11 and the user terminals receive the warning of an abnormality with regard to the communication, while the application program(s) 11 and the user terminals not affected by the failure are not informed and can operate continuously.

FIG. 4 is an explanatory diagram of the operation of a communication control program according to the invention. As shown in the upper portion of FIG. 4 a connection 23 is made between the application program 11 and the terminal 22 and the communication is executed through a communication network 21 by the communication access method 20. It is assumed in FIG. 4 that the communication access method 20 has malfunctioned. At this time, if the communication access method 20 is not processing an actual data transmission, reception or the like, as shown in the lower left portion of FIG. 4 the communication access method 20 operated by the standby process can continue the communication using the operational environment as before, given by the preceding connection 23.

However, if the communication access method 20 malfunctions while actually processing data, as shown in the lower right portion of FIG. 4, the communication access method 20 disconnects the connection 23 and sends a signal indicating the occurrence of an abnormality to the application program 11 or the like.

In the prior art, even when the malfunction occurs while data is not being processed, as in the case shown in the lower left portion of FIG. 4, the connection 23 is disconnected and the operation cannot be continued. According to the present invention, however, the connection 23 is only disconnected if the malfunction occurs while data is being processed, as in the case shown in the lower right portion of FIG. 4, and thus the effect of the malfunction is reduced.

Figure 5:
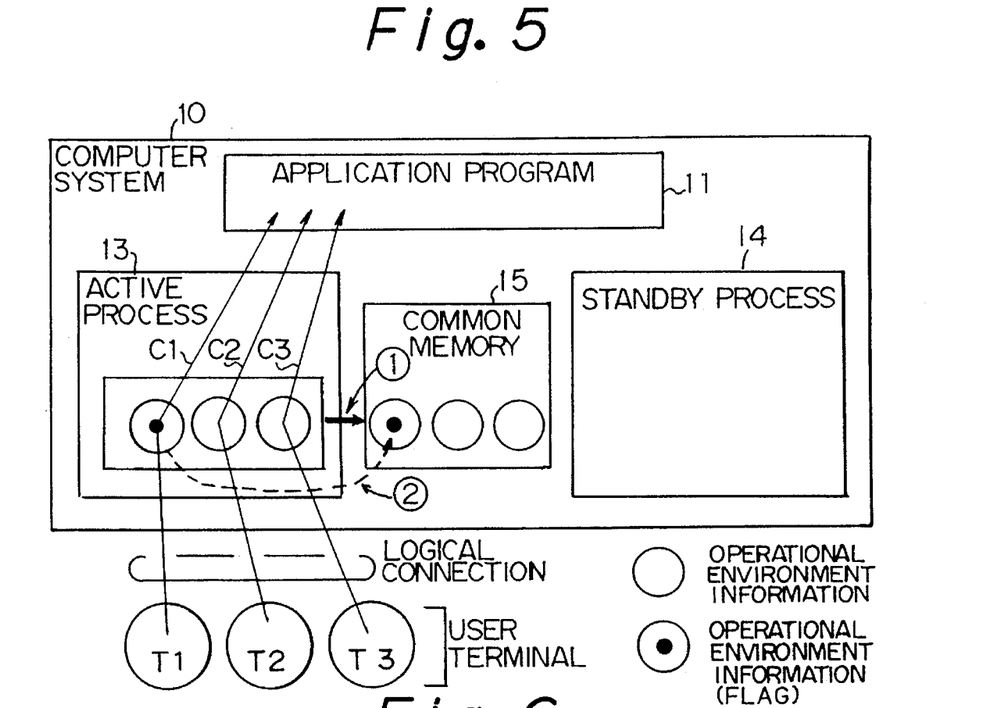
FIG. 5 is a block diagram explaining an active process of the embodiment according to the present invention.
Figure 6:
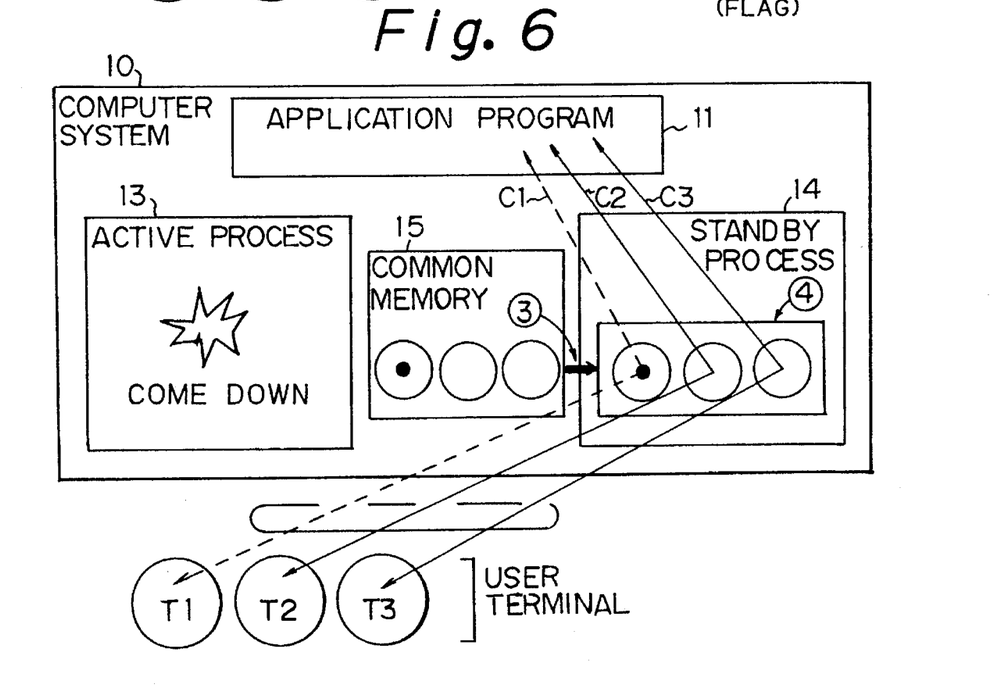
FIG. 6 is a block diagram explaining a standby process of the embodiment of FIG. 5.
Figure 7:
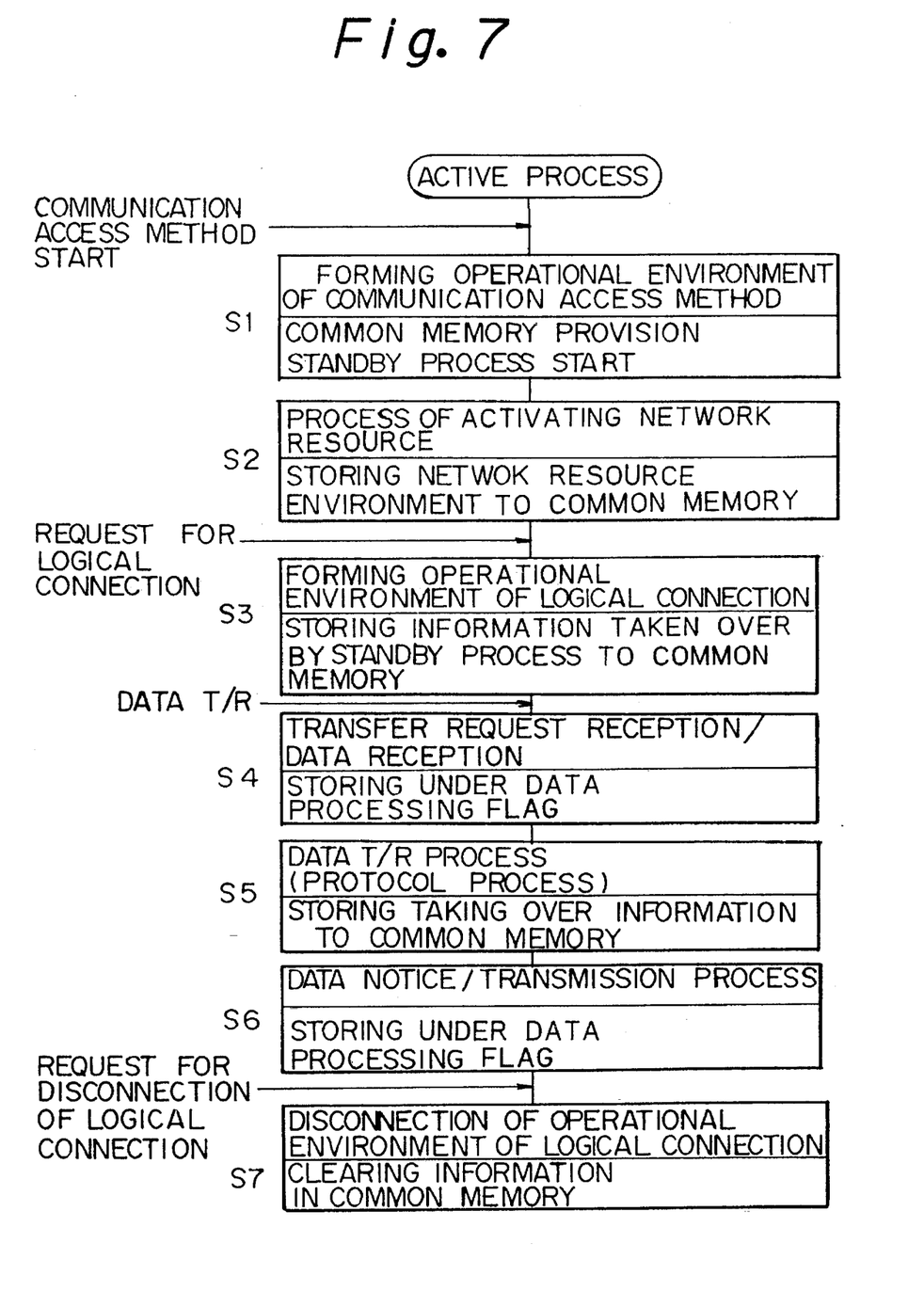
FIG. 7 is a flowchart of the processing of the active process in the communication control program of the embodiment of the present invention.
Figure 8:
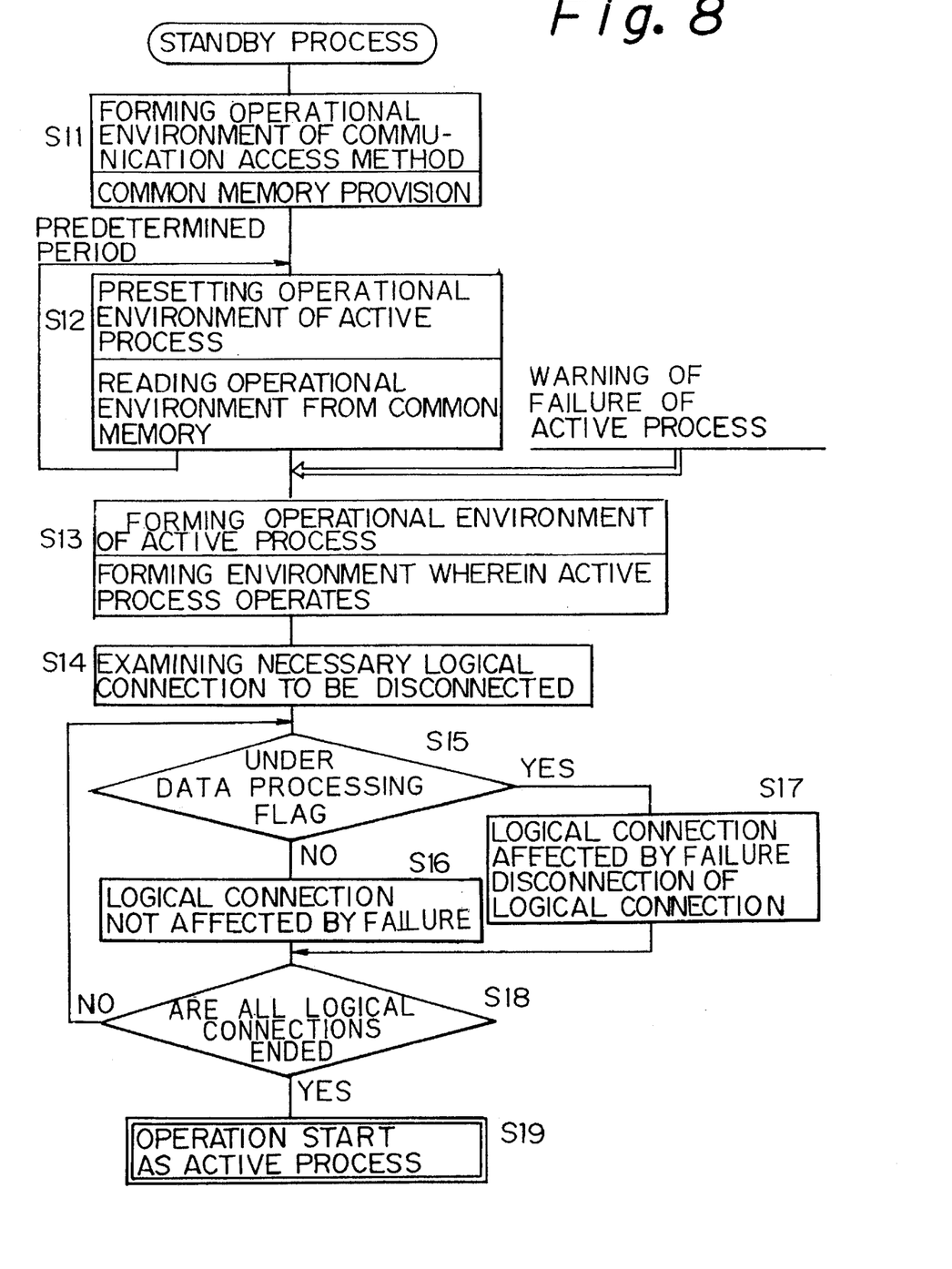
FIG. 8 is another flowchart of the processing of the standby process and is similar to FIG. 7.

The above-mentioned embodiment will be explained in detail. FIGS. 5 and 6 are block diagrams of the embodiment according to this invention, FIG. 7 is a process flowchart of the active process of this embodiment, and FIG. 8 is a process flowchart of the standby process of this embodiment.

FIG. 5 shows an operation of the active process 13 and FIG. 6 shows an operation of the standby process 14. In these Figures, C1 to C3 are connections (logical connections) and T1 to T3 are user terminals.

(1) Operation of the Active Process

A. The active process 13 sequentially stores the operational environment of the connections C1 to C3 in the common memory 15.

B. When an event occurs between the application program 11 and user terminals T1 to T3, the indication (flag) indicating an event in the course of data processing (black circle in FIGS. 5 and 6) is added to the operational environment information managed by the active process 13, and the information stored in the common memory 15.

The flag (under data processing) must be set for an event such that, when the process of the occurring event is started, if the active process 13 malfunctions during the processing and the standby process 14 takes over the operation, the consistency of the process in the event cannot be maintained for the application program 11 or a protocol of the user terminal. For example, a loss of transmission or reception data between the application program 11 and user terminal, generation of a communication protocol inconsistency, or the like, come under this heading or subject. After the processing of this event is completed, the under data processing flag is cleared.

(2) Operation of the Standby Process

C. The operational environment of the active process 13 is formed in the standby process 14 by the information read from the common memory 15.

D. The logical connections between the application program 11 and the user terminals are examined and the under data processing flag stored at the active process 13 is examined.

In the connections C2 and C3 not under data processing, the standby process 14 continues the operation.

In the connection C1 wherein the under data processing flag is stored, since an erroneous operation between the application program 11 and the user terminal T1 may occur if the standby process 14 continues the operation, a warning of an abnormality is sent to both the application program 11 and the user terminal T1.

As explained above, the relationship between the application program and the user is as follows.

When the data is not under processing, no warning is given to the user and the operation continues, and only when the data is under processing is such a warning given to the user. With this warning, the user can go to the recovering process when necessary.

The processing flowchart of the active process 13, for example, is shown in FIG. 7. The processing steps S1 to S7 in FIG. 7 are explained below.

S1: The operational environment of the communication access method is formed by the start of the communication access method. In this embodiment, the common memory is provided and the standby process started in this step.

S2: The process of activating the network resource is carried out. The network resource environment is stored in the common memory.

S3: The operational environment of the logical connection is formed upon a request for the opening of the logical connection from the application program or the user terminal. When a malfunction occurs here, the active process is replaced by the standby process, and the information normally communicated to the user terminal, for example, communication protocol information or the like, is stored in the common memory.

S4: The under data processing flag is stored in the common memory for the data transmission to or reception from the application program or the user terminal.

S5: The data transmission or reception process is carried out according to the communication protocol. If the information, for example, information to be taken out, is necessary, the information is stored in the common memory.

S6: In the data notice/transmission process, when the communication control program informs or transmits the data, the under data processing flag is cleared.

S7: The information of the logical connection in the common memory is disconnected upon a request for the disconnection of the logical connection from the application program or the user terminal.

The process flowchart of the standby process 14 is shown, for example, in FIG. 8. The steps S11 to S19 in FIG. 8 are shown below.

S11: After the standby process is activated by the active process, the operational environment of the communication access method is formed. Further, the common memory is provided to obtain information to be taken from the active process.

S12: The process wherein the operational environment of the active process is set in advance is carried out at a predetermined period. Namely, in each logical connection the operational environment is formed by the information read from the common memory. The presetting is used to shorten the restart time in the standby process when the active process malfunctions, and therefore, the presetting is not always necessary. The setting could also be carried out when the standby process takes over from the active process.

S13: If a warning of the failure of the active process is given, the operational environment of the active process is formed. Namely, the operational environment (network resource, logical connection environment or the like) of the active process is read and the environment wherein the active process operates is formed from the common memory. If, in step S12, the environment is preset, the forming time is shortened.

S14 to S18: The logical connections are all examined to determine those that must be disconnected due to the failure of the active process. In a logical connection, if the under data processing flag is not stored, the logical connection is not affected by the malfunction and so is not disconnected, and the next logical connection is examined. The logical connection having the flag is affected by the malfunction, and accordingly, the logical connection is disconnected and the area in the common memory is cleared. In this disconnection, an abnormality warning is given to a communication request portion. The above processes are repeated for all the logical connections.

S19: The process of the step S14 is applied to all the logical connections, the standby process becomes a new active process, and a normal operation is started.

Figure 9:
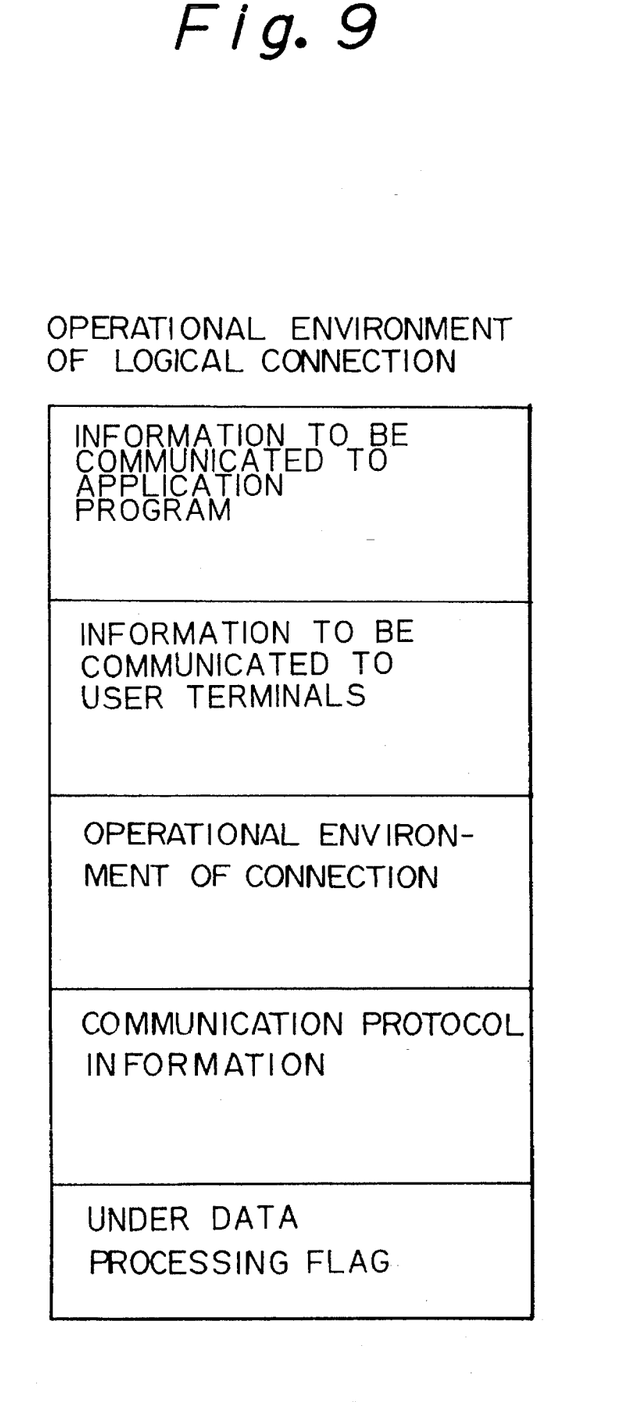
FIG. 9 is an explanatory diagram showing an operational environment of the logical connection.

Next, the operational environment of the logical connection is explained with reference to FIG. 9. The operational environment comprises the following information.

(1) Information to be communicated to the application program.

The information to be communicated to the address space of the application program, for example, address space information for transmitting or receiving data.

(2) Information to be communicated to the user terminals.

Hardware information to be communicated to the user terminal, for example, line address, terminal address or the like (3) Operational environment of connection Environmental information so that connection operates in the communication access method, for example, exclusive information or the like (4) Communication protocol information Communication protocol information to be sent to the user terminal, for example, destination reference, source reference, protocol class, TPDU size, TPDU send sequence number, sequence number indicating the next expected DT TPDU number, or the like (for details, see ISO OSI 8073 transport layer protocol)

The above information is formed in each user terminal and stored in the memory space of the active process. This information is also stored in the common memory. The standby process reads the above information from the common memory and forms the same environment in the memory space of the standby process.

In the communication process using the communication control program, usually the request is processed instantly only by the CPU in the cases of both a data transmission request and a data reception request. Namely, the request is not held in the communication control program. Further, the process of the communication control program is a successive flow from a start of the process to the end thereof.

In the above process, the effect upon the malfunction of the communication control program is as follows.

In a system having one CPU, when the communication control program malfunctions, only one or no communication under processing exists between the application program and the user terminal.

When the failure occurs, there is sometimes communication between the application program and the user terminal under processing by the communication control program.

Also, when the failure occurs, there is sometimes communication between the application program and the user terminal waiting for the processing of the communication control program.

Therefore, the amount of the communication between the application program and the user terminal, which is affected by the malfunction of the communication control program is considered, for example, to be less than 10 percent in a usual system.

In the prior art, all the communications between the application program and the user terminals using the communication control program are affected by the malfunction of the communication control program and the recovering process must be carried out by the user. On the other hand, by applying this invention, more than 90 percent of the communications between the application program and the user terminals, which are not affected by the failure of the communication control program, can be continued as before. Accordingly, it is only necessary for the user to carry out the recovering process for less than 10 percent of the communications.

I claim:

1. A processing method for continuous operation of a communication control program in a computer system, said computer system having an active process, a corresponding standby process and a common memory being accessed by each of said active process and said corresponding standby process, said processing method comprising:

(a) storing in said common memory, by said active process, operational environment information of each logical connection between at least one application program and user terminals, said communication control program controlling logical access between said user terminals and said at least one application program and being controlled alternatively by said active process and said corresponding standby process using said common memory;

(b) setting an under processing flag in said common memory by said active process, as an indication that an event is occurring which will prevent said corresponding standby process from continuing communication by a corresponding logical connection;

(c) clearing, by said active process, said under processing flag for said corresponding logical connection when said event is completed;

(d) reading, by said corresponding standby process, said common memory to obtain said operational environment information stored by said active process in step (a) for each logical connection; and (e) warning a corresponding user terminal that said event has occurred with regard to said corresponding logical connection for each under processing flag set in said common memory, only when operation of said communication control program is continued by said corresponding standby process.

2. A processing method as set forth in claim 1, wherein said operational environment information set in said common memory comprises first information to be communicated to said application program, second information to be communicated to said user terminals, an operational environment of said logical connection, and communication protocol information.

3. A processing method as set forth in claim 1, wherein said common memory stores for each logical connection information regarding communications to be taken over by said corresponding standby process and an under processing flag.

4. A processing method as set forth in claim 1, wherein said event includes start to end of a data transmission and reception process controlled by said active process.

5. A processing method as set forth in claim 1, further comprising said step of (f) disconnecting said corresponding logical connection for which said warning is sent in step (e).

6. A method for obtaining, with a computer program having an active process and a corresponding standby process, continuous communication control in a computer system, said method comprising the steps of:

(a) storing, with said active process, connection information corresponding to said connection between said computer system and a terminal, in a common storage, said connection controlled alternatively by said active process and said corresponding standby process using said common storage;

(b) storing, with said active process, a flag in said common storage when a malfunction occurs in said computer system during an actual transfer of data along said connection;

(c) reading, with said corresponding standby process, said flag in said common storage; and (d) indicating, with said corresponding standby process, said malfunction during said actual transfer of data along said connection corresponding to said flag.

7. A method as set forth in claim 6, additionally comprising said step (e) of disconnecting said connection corresponding to said flag.

8. A method as set forth in claim 6, further comprising said step (e) of warning said user of said actual transfer of data corresponding to said flag.

* * * * *

UNITED STATES PATENT AND TRADEMARK OFFICE
CERTIFICATE OF CORRECTION

PATENT NO. : 5,600,808
DATED : Feb. 4, 1997
INVENTOR(S) : KASUKAWA

It is certified that error appears in the above-indentified patent and that said Letters Patent is hereby corrected as shown below:

Col. 3, line 61, delete "providing".

Col. 4, line 27, after "indication" delete "of".

The drawing sheets, consisting of Figs. 3-7, should be deleted to be replaced with the drawing sheets, consisting of Figs 3-7, as shown on the attached pages.

Signed and Sealed this

Fifteenth Day of July, 1997

*Attest:*

BRUCE LEHMAN

*Attesting Officer*   Commissioner of Patents and Trademarks